US010619816B2

(12) United States Patent
Reisinger et al.

(10) Patent No.: US 10,619,816 B2
(45) Date of Patent: Apr. 14, 2020

(54) VEHICLE HEADLIGHT

(71) Applicant: ZKW GROUP GMBH, Wieselburg (AT)

(72) Inventors: Bettina Reisinger, Amstetten (AT); Josef Pürstinger, Bad Hall (AT); Markus Danner, Ollersdorf (AT)

(73) Assignee: ZKW GROUP GMBH, Wieselburg (AT)

( * ) Notice: Subject to any disclaimer, the term of this patent is extended or adjusted under 35 U.S.C. 154(b) by 0 days.

(21) Appl. No.: 16/329,645

(22) PCT Filed: Jun. 26, 2017

(86) PCT No.: PCT/AT2017/060158
§ 371 (c)(1),
(2) Date: Feb. 28, 2019

(87) PCT Pub. No.: WO2018/045402
PCT Pub. Date: Mar. 15, 2018

(65) Prior Publication Data
US 2019/0195459 A1 Jun. 27, 2019

(30) Foreign Application Priority Data
Sep. 8, 2016 (AT) .................................. 50791/2016

(51) Int. Cl.
*F21S 41/675* (2018.01)
*G02B 26/08* (2006.01)
(Continued)

(52) U.S. Cl.
CPC .............. *F21S 41/675* (2018.01); *B60Q 1/04* (2013.01); *F21S 41/14* (2018.01); *F21S 41/147* (2018.01);
(Continued)

(58) Field of Classification Search
CPC ..................................................... F21S 41/675
See application file for complete search history.

(56) References Cited

U.S. PATENT DOCUMENTS

2007/0024549 A1   2/2007  Choi et al.
2007/0166864 A1   7/2007  Lee et al.
(Continued)

FOREIGN PATENT DOCUMENTS

JP    2015182660 A    10/2015

OTHER PUBLICATIONS

Search Report for Austrian Application No. A 50791/2016 dated May 19, 2017.

*Primary Examiner* — Sean P Gramling
(74) *Attorney, Agent, or Firm* — Eversheds Sutherland (US) LLP

(57) ABSTRACT

The invention relates to a vehicle headlamp (501), comprising a light source unit (502), a controllable reflector (590), an optically transparent cover (504), an optical absorber device (505), an optical shielding element (506), and a projection optics (507). The light source unit (502) is designed to emit light and to illuminate in a first direction of propagation (510), in the optical path of which the controllable reflector (590) is arranged, and the controllable reflector (590, 690, 70) at least partially reflects the light in a second direction of propagation (520), in the optical path of which the projection optics (507) is arranged and is oriented in a direction in front of the vehicle, in order to form a light pattern in front of the vehicle. The optically transparent cover (504), is arranged in a second plane (551) between the light source unit (502) and the controllable reflector (590) in such a way that light passes through the optically transparent cover (504) in the first direction of propagation (510) and in the second direction of propagation (520). The light emitted by the light source unit (502) is incident on the optically (Continued)

transparent cover (504) in the first direction of propagation (510) and is reflected partially thereby in a fourth direction of propagation (540) and is blocked in the fourth direction of propagation (540) by the optical shielding element (506).

16 Claims, 8 Drawing Sheets

(51) Int. Cl.
| | |
|---|---|
| *F21S 41/147* | (2018.01) |
| *F21S 41/40* | (2018.01) |
| *F21S 41/14* | (2018.01) |
| *F21S 41/25* | (2018.01) |
| *F21S 41/36* | (2018.01) |
| *B60Q 1/04* | (2006.01) |
| *F21S 41/255* | (2018.01) |

(52) U.S. Cl.
CPC ............... *F21S 41/25* (2018.01); *F21S 41/36* (2018.01); *F21S 41/40* (2018.01); *G02B 26/0833* (2013.01); *G02B 26/0841* (2013.01); *F21S 41/255* (2018.01)

(56) References Cited

U.S. PATENT DOCUMENTS

| | | | |
|---|---|---|---|
| 2013/0242275 | A1 | 9/2013 | Kilcher et al. |
| 2014/0340909 | A1 | 11/2014 | Yagi |
| 2015/0092435 | A1* | 4/2015 | Yamamura ........... B60Q 1/0005 362/512 |
| 2015/0191115 | A1 | 7/2015 | Yamamura et al. |
| 2015/0211703 | A1 | 7/2015 | Nakazawa et al. |
| 2015/0219302 | A1 | 8/2015 | Yagi et al. |

\* cited by examiner

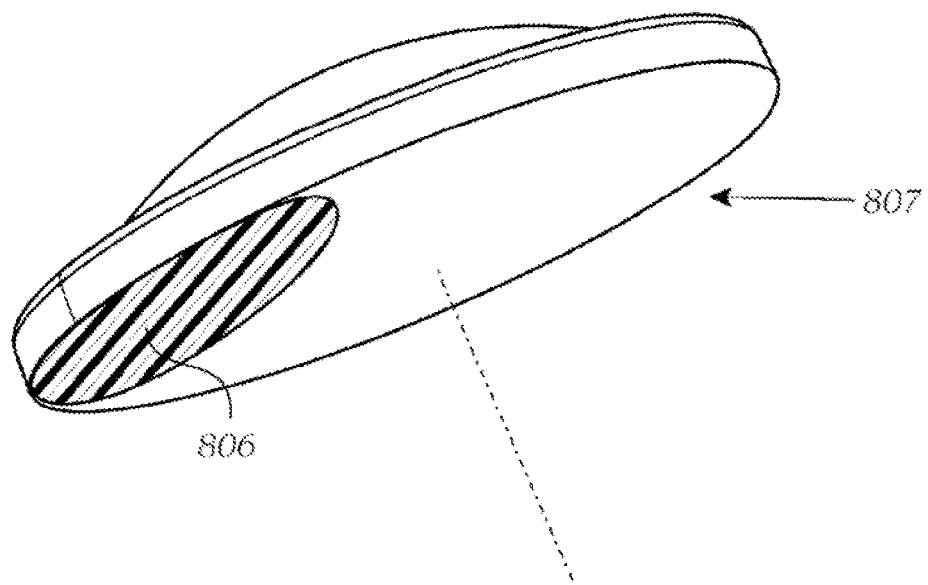
Fig. 8
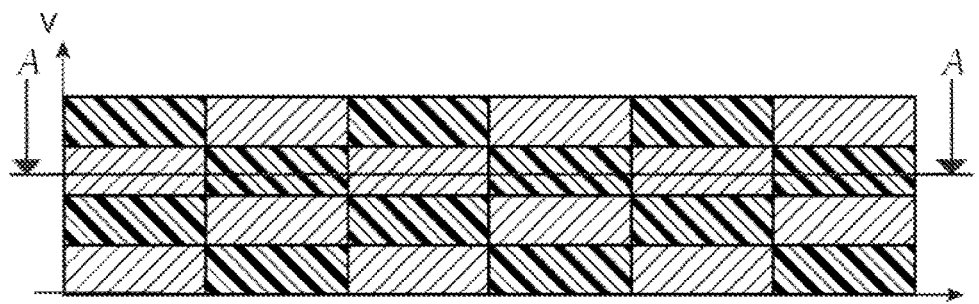
Fig. 9a
Fig. 9b
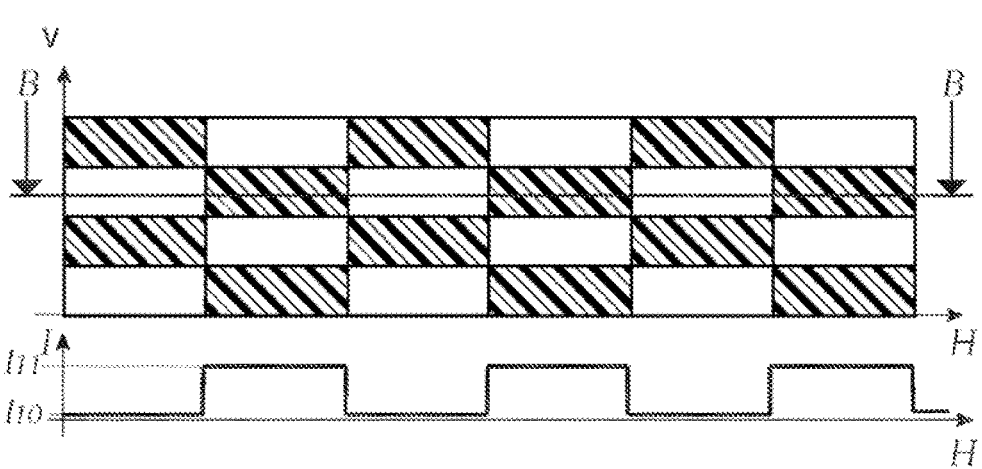
Fig. 10a
Fig. 10b

VEHICLE HEADLIGHT

The invention relates to a vehicle headlamp, comprising at least one light source unit, at least one controllable reflector, at least one optically transparent cover, at least one optical absorber device, at least one optical shielding element, and at least one projection optics, wherein the light source unit is designed to emit light and to illuminate in a first direction of propagation, in the optical path of which the controllable reflector is arranged, and the controllable reflector at least partially reflects the light in a second direction of propagation, in the optical path of which the projection optics is arranged and is oriented in a direction in front of the vehicle, in order to form a light pattern in front of the vehicle, wherein the controllable reflector comprises an arrangement of multiple controllable individual mirrors, the reflective surfaces of which in a non-tilted state are arranged level in a first plane and in the form of a rectangular matrix of individual mirrors, wherein the light emitted from the light source unit is incident on the controllable reflector in the first direction of propagation and in a first controlled state of said reflector is reflected thereby in the direction of the second direction of propagation and/or in a second controlled state of the controllable reflector is reflected in a third direction of propagation, and the optically transparent cover is arranged in a second plane between the light source unit and the controllable reflector in such a way that light passes through the optically transparent cover in the first direction of propagation and in the second direction of propagation.

When developing the current headlamp systems, there is increasing focus placed on the desire to be able to project a homogeneous light pattern of the highest resolution possible onto the roadway. The term "roadway" is used here by way of simplified illustration, because it is of course dependent on the local conditions as to whether a light pattern is actually disposed on the roadway or also extends therebeyond. In principle, the light pattern in the sense used here is defined on the basis of a projection onto a vertical surface in accordance with the appropriate standards relating to motor vehicle illumination technology. The generated light pattern also should be adaptable to different traffic situations.

In order to satisfy the described need, inter alia headlamps have been developed in which a variably controllable reflector surface is formed from a plurality of micromirrors and reflects a light emission generated by a light source unit towards selected areas in the direction of emission of the headlamp. Lighting devices of this kind are advantageous in vehicle construction due to their very flexible light functions, since the illuminance can be controlled individually for different illuminated areas and any light functions with different light distributions can be realised, such as a dipped beam light distribution, a signalling beam light distribution, a town beam light distribution, a motorway beam light distribution, a cornering beam light distribution, a high beam light distribution, an auxiliary high beam light distribution, or in order to form glare-free high-beam light (also known as an adaptive driving beam headlighting system, or ADB).

What is known as the digital light processing (DLP®) projection technique is used for the micromirror assembly, wherein images are generated by modulating a digital image onto a light beam. Here, by means of a rectangular arrangement of movable micromirrors, also referred to as pixels, the light beam is broken down into sub-regions and is then either reflected into the projection path or out of the projection path, pixel by pixel. This technique is based on an electronic component containing an arrangement of micromirrors in the form of a matrix of mirrors and the control technology therefor, and is referred to as a "digital micromirror device" (DMD). A DMD microsystem is a spatial light modulator (SLM), which consists of micromirror actuators arranged in a matrix, that is to say tiltable reflective surfaces, for example with an edge length of approximately 16 µm or less. The mirror surfaces are constructed in such a way that they are movable by the application of electrostatic fields. Each micromirror is individually adjustable in respect of its tilt angle and generally has two stable end states, it being possible to change between these states up to 5000 times within a second. The individual micromirrors for example can be controlled by pulse width modulation (PWM) in order to image further states of the micromirrors in the main direction of radiation of the DMD arrangement, the (over time) averaged reflectivity of said micromirrors lying between the two stable states of the DMD. The number of mirrors corresponds to the resolution of the projected image, wherein one mirror may represent one or more pixels. In the meantime, DMD chips with high resolutions in the megapixel range have become obtainable. The technology underlying the adjustable individual mirrors is micro-electromechanical systems (MEMS) technology.

Whereas DMD technology has two stable mirror states and the reflection factor can be adjusted by modulation between both stable states, "analogue micromirror device" (AMD) technology has the property that the individual mirrors can be adjusted in variable mirror positions, and in each case are in a stable state there.

If an electronic component in DLP® technology is used in a vehicle headlamp, it may be necessary to protect the component against external influences, such as moisture or dust. This can be achieved by an optically transparent cover in front of the DLP® component, which cover for example is made of glass or plastic. Although covers of this kind are often provided with a high-quality antireflection coating, some of the incident light is still reflected. Thus, undesirable reflections may occur as a result of the surface of the optically transparent cover and may interfere with the light pattern generated in front of the vehicle headlamp and/or may compromise the contrast in the light pattern on the roadway. Especially for ADB vehicle headlamps, it is important to attain the highest possible contrast ratio so as to enable a high luminous intensity in the illuminated areas and, accordingly, good vision for the driver of the vehicle, and at the same time so as not to exceed glare values in the masked-out segments, as are regulated for example by ECE R123, where for example a specific luminous intensity is defined in the HV point as upper limit in a class C light distribution, so as not to dazzle oncoming traffic and/or road users travelling ahead.

The object of the present invention is to overcome the aforesaid disadvantages.

The object is achieved in accordance with the invention by a vehicle headlamp of the kind described at the outset in that the light emitted by the light source unit is incident on the optically transparent cover in the first direction of propagation and is reflected thereby partially in a fourth direction of propagation and in the fourth direction of propagation is blocked by the optical shielding element.

As a result of the optically transparent cover, interfering reflections may be created on the underside and upper side thereof and reflected in the fourth direction of propagation.

As a result of the solution according to the invention it is achieved that the light reflected or absorbed by the shielding element is prevented from further light propagation in the direction of the second direction of propagation, in which the projection optics is arranged. As a result of this measure the contrast of the light pattern projected in front of the vehicle by the projection optics is increased.

It is particularly advantageous if an optical absorber device is arranged in the third direction of propagation, by means of which absorber device the light is converted into heat and an interfering lighting effect within the vehicle headlamp is prevented or reduced.

As already mentioned, the assembly of multiple controllable individual mirrors of the controllable reflector is arranged with the reflective surfaces of said mirrors level in the first plane in the non-tilted state, whilst the optically transparent cover is in the second plane.

It is particularly advantageous if the second plane lies parallel to the first plane, whereby a particularly simple arrangement that offers cost and assembly advantages can be created. Alternatively, it is also advantageous if the second plane is arranged at a third angle to the first plane, wherein the third angle is greater than 0° and smaller than 15°, preferably greater than 0° and smaller than 5°. An improvement of the light pattern is thus achieved because the reflections by the optically transparent cover can be further reduced in that the third angle ensures that the reflections are deflected at least only in part in the second direction of propagation and only a lower proportion has to be suppressed in the light pattern by the optical shielding element.

If the third angle is greater than 0°, it is thus favourable if the projections in the first and fourth direction of propagation overlap in such a way that the overlap is smaller than if the third angle is equal to 0°. Consequently, the shielded region in the projection in the first direction of propagation is much smaller, and the imaging optics is thus more efficient with the same magnification (corresponds to the width of the light distribution).

It is also favourable if the shielding element is arranged at least partially in the optical path of the second direction of propagation and in front of the projection optics, which enables a small design of the vehicle headlamp. In addition, only a low precision of the dimensions and the position of the shielding element is necessary.

Alternatively, it is particularly favourable if the shielding element is arranged at least partially in the optical path of the second direction of propagation and after the projection optics. It can thus be achieved that the shielding and associated optical reflections or thermal emissions occur far from the optical absorber device, which may be favourable for the distribution of the thermal losses.

The shielding element can be arranged in the form of a visual field plate after the projection optics, since the visual field plate delimits the penetrating beam bundle either at the location of the entry or exit of the visual field plate. Both locations are conjugated with one another, that is to say they are linked to one another via the projection lens.

It is particularly advantageous if the shielding element is a plate, which allows a particularly simple and favourable design.

Alternatively, it is advantageous if the shielding element is a further, additional optical absorber, that is to say a shielding absorber, in particular if the shielded light can be converted directly at the shielding element into heat and the optical absorber device of the vehicle headlamp consequently does not heat up additionally. It is thus achieved that the optical absorber device of the vehicle headlamp can be made smaller and more economical, and consequently a smaller overall size of the headlamp as a whole can be achieved.

The shielding element or the shielding absorber and the optical absorber device of the vehicle headlamp, however, can also be formed in one part as a common component in order to keep the number of components to be assembled in a vehicle headlamp low, and consequently in order to keep the construction, assembly, servicing and component costs low.

It is advantageous if the light emitted by the light source unit in the first direction of propagation is incident on the optically transparent cover at a first angle, wherein the first angle lies in a range between 50° and 65°, preferably between 55° and 60°. A particularly compact design is thus achieved since the used components can be arranged closely next to one another.

In a particularly advantageous embodiment of the invention the light source unit can comprise at least one semiconductor light source, preferably a high-power LED, a high-current LED, or a laser diode in conjunction with an optical converter ("phosphor"), and preferably a primary optics in the form of an optical lens system, so as to create a particularly economical arrangement. Semiconductor light sources, inter alia, have a particularly high efficiency and consequently generate little waste heat, and therefore an associated cooling device can be realised economically. The use of plasma-based light sources is also possible.

The invention and advantages thereof will be described in greater detail hereinafter with reference to non-limiting exemplary embodiments, which are illustrated in the accompanying drawings, in which:

FIG. 8 shows an embodiment of a projection lens with plate;

FIG. 9a shows a light distribution, as produced by a vehicle headlamp with DLP® technology according to the prior art;

FIG. 9b shows an intensity distribution in the section A-A according to FIG. 9a;

FIG. 10a shows a light distribution as produced by a vehicle headlamp according to the invention;

FIG. 10b shows an intensity distribution in the section B-B according to FIG. 10a.

Exemplary embodiments of the invention will now be explained in greater detail with reference to the figures. In particular, parts important for the invention in a headlamp are shown, wherein it is clear that a headlamp also contains many other parts, not shown, which enable expedient use in a motor vehicle, for example in particular a passenger vehicle or motorcycle. For the sake of clarity, cooling devices for components, control electronics, further optical elements, mechanical adjustment devices, and holders therefore are not shown, for example. A number of the explained components within a headlamp can be used in other exemplary embodiments not shown.

In the further description, the term different "configurations" refers to the geometric arrangement of various components relative to one another in respect of dimensions, distances and angular positions.

The term different "angular position of an optically transparent cover" refers to the arrangement of a transparent cover in relation to a controllable reflector with regard to dimensions, distances and angular positions.

In the following description of the figures, reference is made to directions of propagation, wherein it is clear that this means all light beam components of an emitted light of which the optical axis runs in the particular referenced direction of propagation or also parallel thereto.

It is known to a person skilled in the art that the illustrated arrangements have been sketched with ideal dimensions, distances and angular positions, wherein deviations thereof must be taken into consideration in practice. This also relates to the actual course of light beam components, which may have deviations from the ideal, parallel course, which for example can be caused by the practical design of optical elements such as lenses or reflectors.

The illustrated figures show individual embodiments of the invention, wherein the shown embodiments do not limit the invention or scope of protection thereof in accordance with the accompanying claims. This thus also means that the individual shown embodiments can be combined with one another arbitrarily and in so doing form subject matter for the scope of protection of the accompanying claims. For example, the embodiment according to FIG. 5 can be combined with that according to FIG. 6 and can also form part of the scope of protection of the accompanying claims. The embodiments discussed for individual figures and advantages thereof consequently apply for all embodiments.

Figure 1:
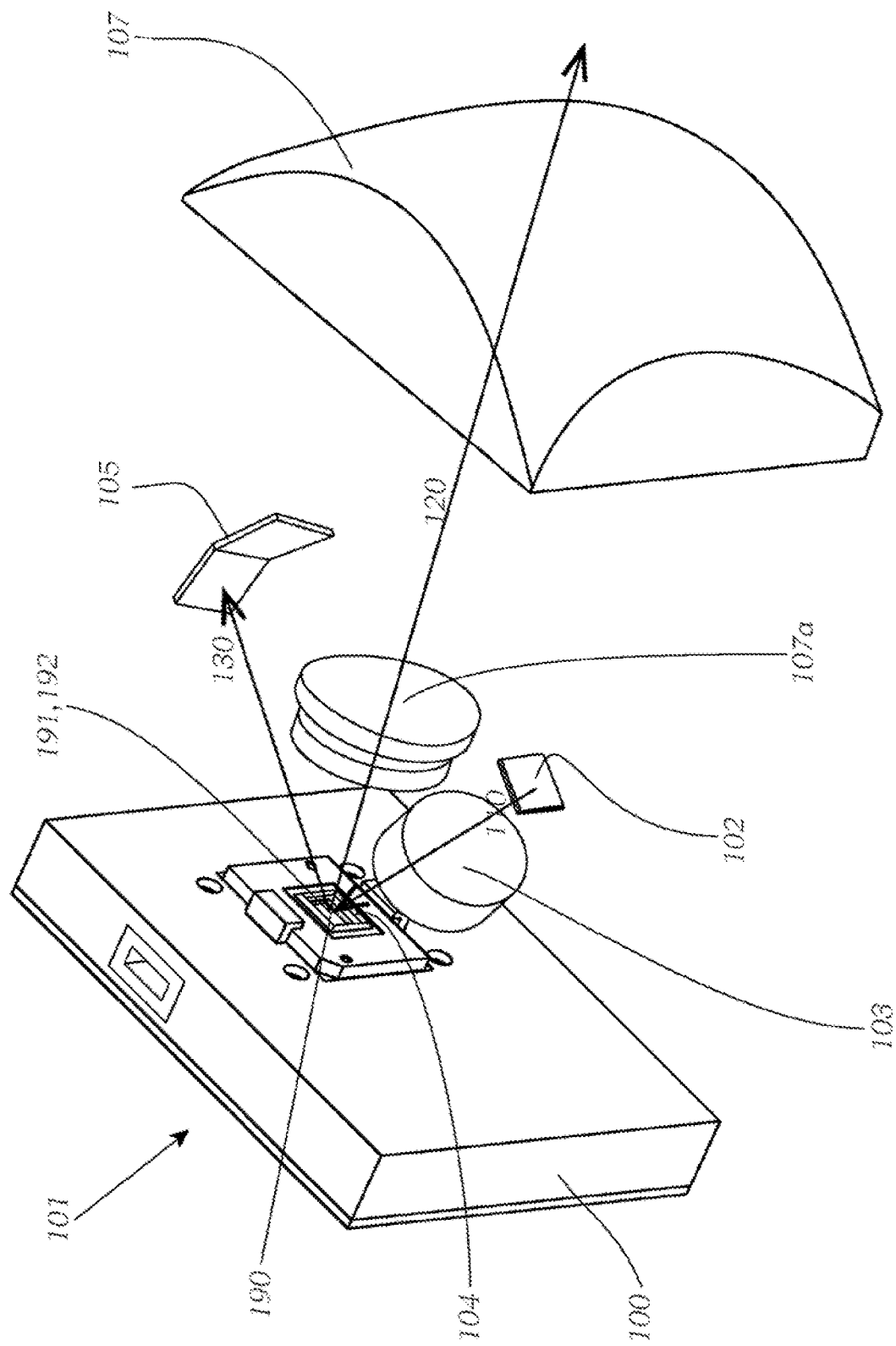
FIG. 1 shows a schematic perspective depiction of an arrangement of optical components for a vehicle headlamp according to the prior art, which comprises a controllable reflector.

FIG. 1 schematically shows a perspective illustration of an arrangement of a vehicle headlamp 101 according to the prior art, which comprises a light source unit 102, a primary optics 103, a controllable reflector 190, which is housed in an electronics housing 100, an optically transparent cover 104, an optical absorber device 105, and a projection optics 107, 107a.

The light source unit 102 comprises a light source which emits light at least in the first direction of propagation 110. The first direction of propagation 110 runs starting from the light source unit 102 or the contained light source through the primary optics 103 to the controllable reflector 190, which comprises a plurality of controllable individual mirrors 191, 192. The controllable reflector 190 is connected to a control electronics which controls the controllable reflector 190 and for example is arranged in the electronics housing 100 and, besides the power supply, can also ensure appropriate cooling of the controllable reflector 190. So that the controllable reflector 190 can modulate the light in accordance with its optical function, it protrudes through a recess from the electronic housing 100 and is thus accessible for the further optical components in order to cooperate therewith.

The primary optics 103 and the projection optics 107, 107a can be embodied in a number of parts or in a number of stages in order to be adapted to the particular imaging requirements. In addition, the primary optics 103 can be part of the light source unit 102, for example so as to use a common mounting device or so as to be adjustable more easily. Alternatively, the primary optics can be embodied as a beam-shaping mirror system. In other words it is also possible that the first direction of propagation does not lead in a straight line from a light source unit through optical lenses of a primary optics to a controllable reflector. For example, the light can be deflected via a curved mirror.

The controllable reflector 190 in a first controlled state is designed to deflect the light at least partially in a second direction of propagation 120, in which an imaging or projection optics 107 is arranged. The projection optics 107 is designed to form a light pattern in front of a vehicle.

In a second controlled state of the controllable reflector 190, light can be reflected in a third direction of propagation 130, in which an optical absorber device 105 is arranged.

Figure 2:
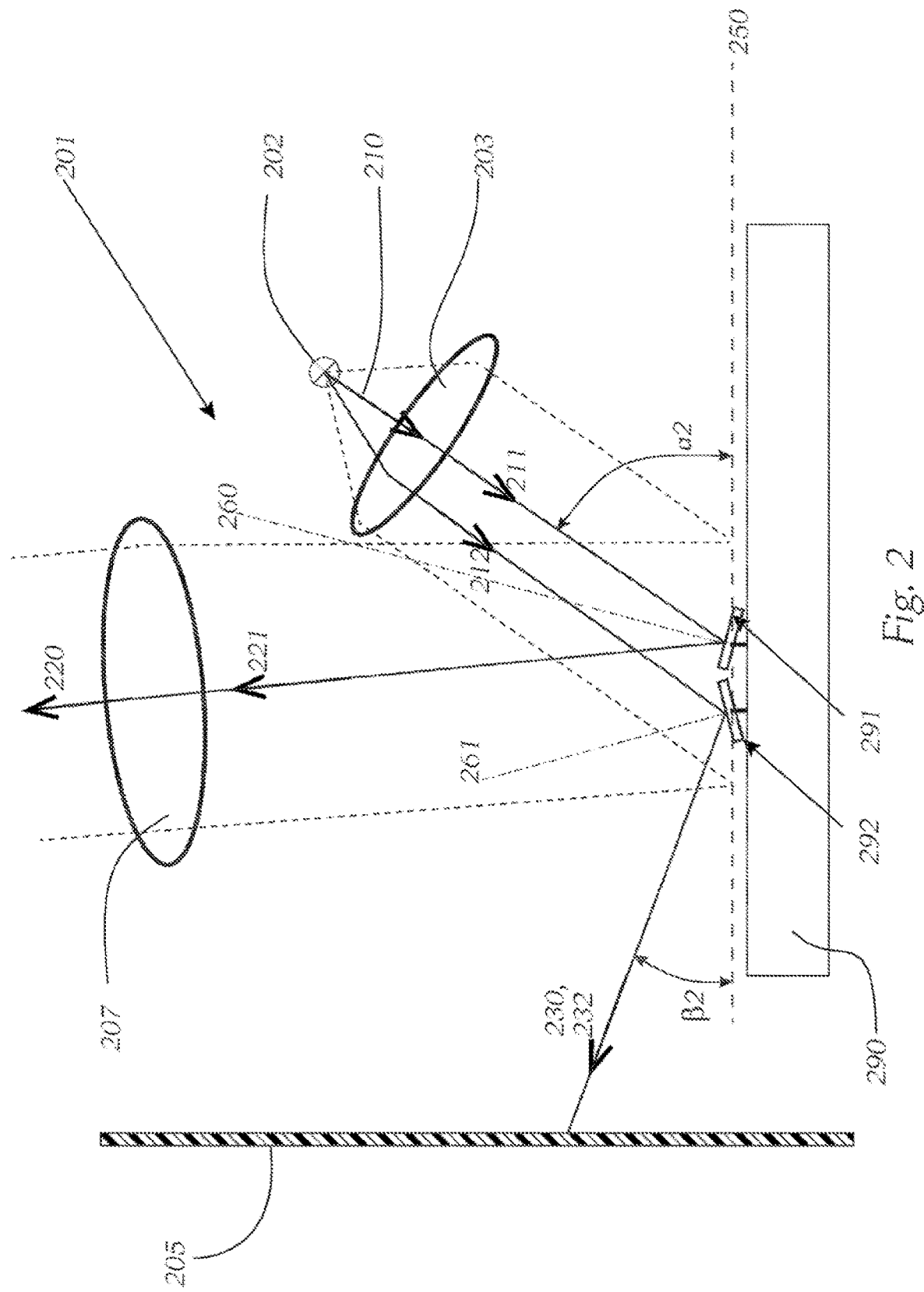
FIG. 2 shows a schematic depiction of the operating principle of an arrangement in a first configuration, comprising a controllable reflector.

FIG. 2 shows a schematic illustration of the operating principle of an arrangement of a vehicle headlamp 201 according to the prior art in a first configuration, which corresponds substantially to the arrangement according to FIG. 1 and is illustrated in a detailed side view.

A light source unit 202 is designed to emit light, wherein a significant proportion of the light emitted from the light source unit 201 is deflected as a light beam in a first direction of propagation 210, in which a controllable reflector 290 is arranged. A primary optics 203 in the form of a lens system is arranged between the light source unit 202 and the controllable reflector 290 and is suitable for focusing and irradiating the light in the plane 250 of the controllable reflector (largely parallel light beams have been shown in the figures for the sake of simplicity) and consequently for illuminating the controllable reflector 290 uniformly, with the light-emitting surface of the light source unit 202 being arranged in the focal point of the primary optics 203. For example, semiconductor light sources in the form of LEDs can be used as light source of the light source unit 202. For example, the geometric centre point of the light-emitting surface of the LED can be used as light source. It can be arranged for example in the focal point of the primary optics 203. The primary optics 203 is often already integrated in an LED component, and the LED component can illuminate the controllable reflector 290 largely uniformly. The lens system can consist of converging and/or diverging lenses.

The emitted light is illustrated by two first light beams 211, 212, which form beam parts of the light directed in the first direction of propagation 210. Two first light beams 211, 212 lie parallel to one another. The first direction of propagation 210 runs starting from the light source unit 202 through the primary optics 203 to the controllable reflector, at which two comprised controllable individual mirrors 291, 292 are shown by way of example.

The controllable reflector 290 reflects the light at least partially in a second direction of propagation 220, in which an imaging or projection optics 207 is arranged. The projection optics 207 is designed to form a light pattern in front of the vehicle.

The controllable reflector 290 comprises an arrangement with a plurality of controllable individual mirrors 291, 292, the reflective surfaces of which together, in a level non-tilted basic position, form a first plane 250 and for example are arranged in the form of a rectangular matrix of individual mirrors 291, 292.

The light emitted from the light source unit 202 is incident on the controllable reflector 290 or individual mirrors 291, 292 thereof at a first angle $\alpha 2$ in the first direction of propagation 210 and in a first controlled state of said reflector is reflected thereby at the surface normal 260 of the mirror surface of the individual mirror 291 in the direction of the second direction of propagation 220. In a second controlled state of the controllable reflector 292, the light is reflected at the surface normal 261 of the mirror surface of the individual mirror 292 at a second angle $\beta 2$ in a third direction of propagation 230, in which an optical absorber device 205 is arranged.

Consequently, the angle $\alpha 2$ corresponds to an angle of the irradiated light beam relative to the controllable reflector 290 or the plane 250. The angle $\beta 2$ corresponds to an angle of the reflected light beam of the controllable reflector 290 in a masked-out state of the controllable reflector 290 or of the individual mirror 292 relative to the plane 250.

A non-tilted basic position of an individual mirror is understood to mean the stable state, in which the individual mirror does not experience any deflection relative to its axis of rotation and therefore assumes a neutral position. Consequently, in this state the mirror surfaces of all individual mirrors together form the plane 250. This state usually can be attained only in a configuration of a DMD chip if there is no control in effect or if there is no operating or control voltage applied to the DMD chip or to the individual mirrors.

In addition, each individual mirror has two further stable states, which correspond to the end positions of the pivoting of the individual mirrors, and for example are pivotable to an angle of +12° and −12°, starting from the non-tilted state. It is clear here that the end positions do not have to be the maximum possible pivoted positions of the individual mirrors, and instead are the positions of the individual mirrors in which a stable state of the mirror in a pivoted position can be achieved. Consequently, the two stable states are used primarily to switch over the direction of reflection of an incident light beam between two defined directions and to achieve preferably either an irradiation or an absorption of the light in these two directions. The described tilting can be realised both with a DMD and with an AMD.

Figure 3:
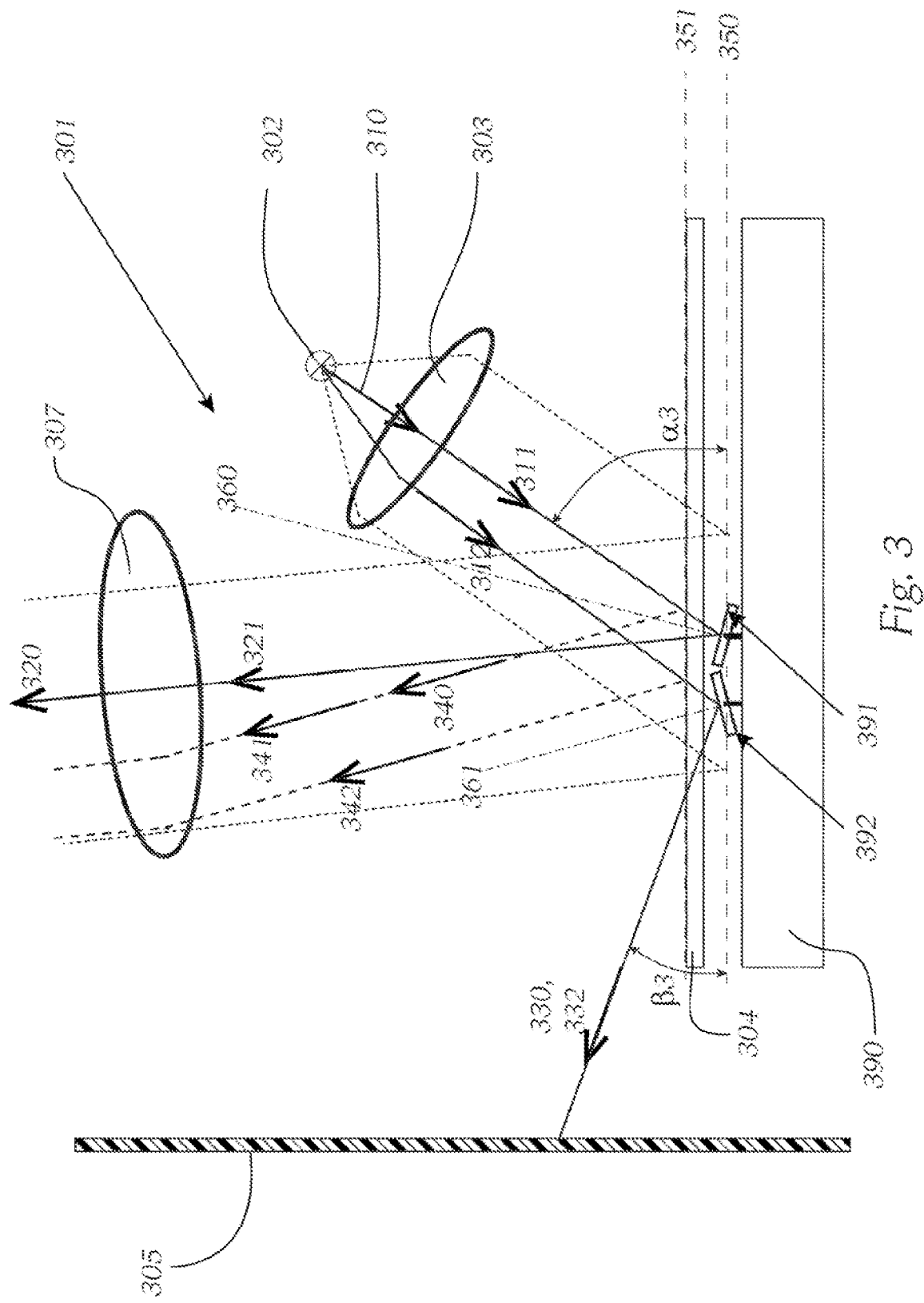
FIG. 3 shows a schematic depiction of the operating principle of an arrangement in a second configuration, comprising a controllable reflector with an optically transparent cover in a first angular position.

FIG. 3 shows a schematic illustration of the operating principle of an arrangement of a vehicle headlamp 301 according to the prior art in a second configuration which corresponds to a development of the arrangement according to FIG. 1 or FIG. 2 and comprises a controllable reflector 390 with an optically transparent cover 304 in a first angular position, in which the controllable reflector 390 and an optically transparent cover 304 are oriented parallel to one another.

The optically transparent cover 304 can still reflect light incident on its surface even if the surface is provided for example within an antireflection coating. An antireflection coating merely reduces the extent of undesirable reflections, however residual reflections remain, which may disturb the light pattern of a vehicle headlamp because they reduce the contrast. The optically transparent cover 304 can be made of an optically transparent glass or a plastic such as acrylic or polycarbonate, wherein a high light permeability of the used material is important.

The optically transparent cover 304 is arranged in a second plane 351, parallel to the first plane 350, between a light source unit 302 and the controllable reflector 390 in such a way that light can pass through the optically transparent cover 304 in a first direction of propagation 310 and in a second direction of propagation 320.

In addition, light can pass through the optically transparent cover 304 along a third direction of propagation 330 if light is conducted in the direction of an optical absorber device 305.

The light emitted from a light source unit 302 can be incident on the optically transparent cover 304 in the first direction of propagation 310 at the first angle $\alpha 3$, and is reflected partially by the surface thereof and parallel to the second direction of propagation 320 in a fourth direction of propagation 340.

The descriptions provided in relation to the previous figures apply similarly for the other elements and illustrations of the shown vehicle headlamp 301.

The fourth direction of propagation 340 may be arranged in the optical path of the imaging or projection optics 307 and may lead to undesirable scattered light, which, similarly to the light distribution generated by the assembly, is projected in a direction in front of the vehicle and can form a light pattern in front of the vehicle. The undesirable scattered light or light pattern thereof often reduces the contrast of the light pattern projected in the second direction of propagation 320, which impairs the light function of the vehicle undesirably.

Figure 4:
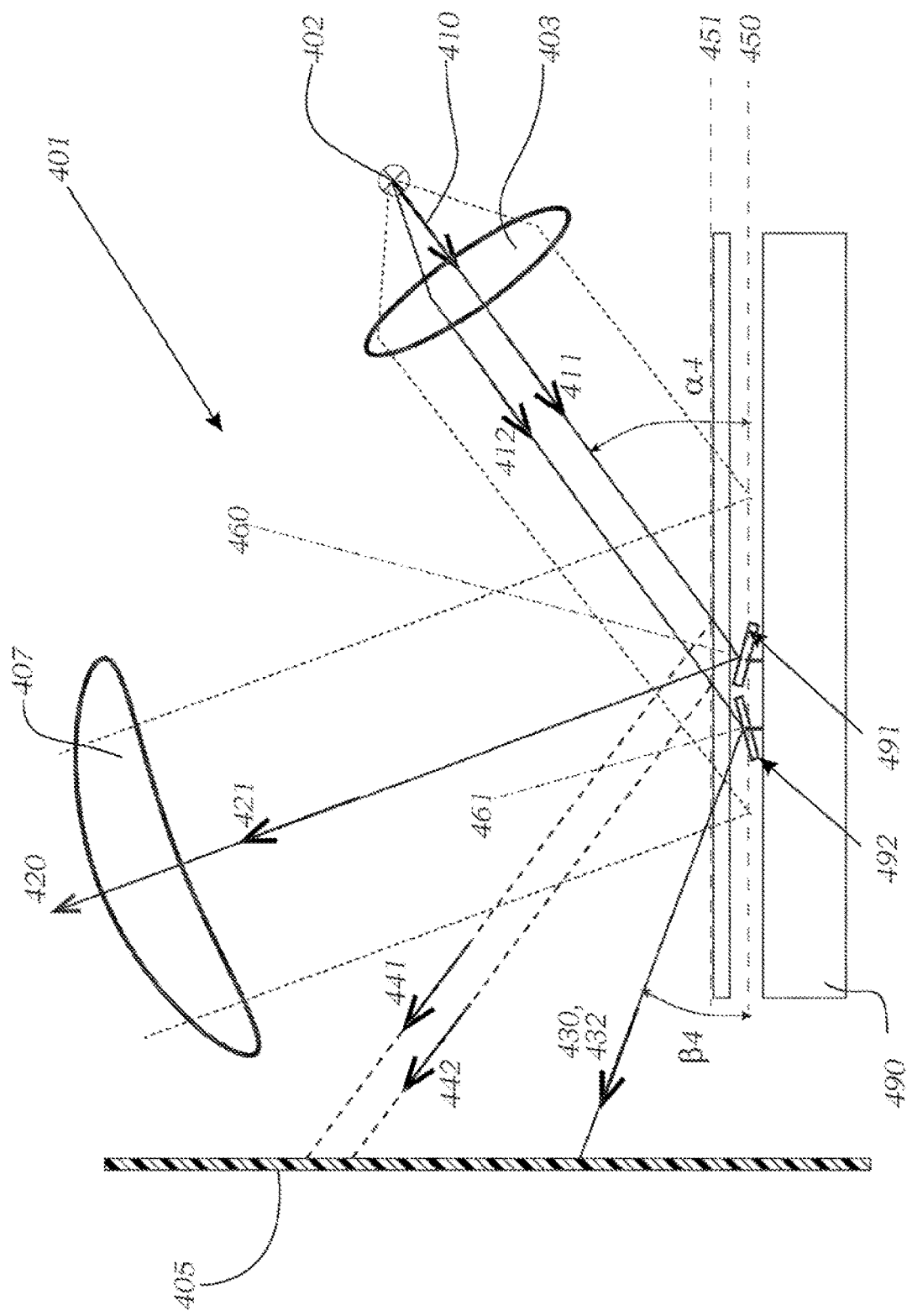
FIG. 4 shows a schematic depiction of the operating principle of an arrangement in a third configuration, comprising a controllable reflector with an optically transparent cover in the first angular position.

FIG. 4 shows a schematic illustration of the operating principle of an arrangement of a vehicle headlamp 401 according to the prior art in a third configuration, which represents an alternative variant of the arrangement according to FIG. 1, FIG. 2 or FIG. 3 and comprises a controllable reflector 490 with an optically transparent cover 404 in the first angular position, in which the controllable reflector 490 and the optically transparent cover 404 are oriented parallel to one another.

The controllable reflector 490 comprises an arrangement of a plurality of controllable individual mirrors 491, the reflective surfaces of which, in a non-tilted state, are arranged level in a first plane 450 and in the form of a rectangular matrix of individual mirrors 491.

The optically transparent cover 404 is arranged in a second plane 451 between the light source unit 402 and the controllable reflector 490 in such a way that light can pass through the optically transparent cover 404 in a first direction of propagation 410 and in a second direction of propagation 420.

The descriptions provided in relation to the previous figures apply similarly for the other elements and illustrations of the shown vehicle headlamp 401.

The first angular position of the optically transparent cover 404 is defined in such a way that the first plane 450 is arranged parallel to the second plane 451.

The third configuration is characterised in respect of its angle of incidence in that a first angle $\alpha 4$ relative to the first plane 450 is smaller than the corresponding first angle $\alpha 3$ relative to the first plane 350 of the arrangement according to FIG. 3. As a result of this selection of the first angle $\alpha 4$, it can be achieved that no light or at least significantly less light passes in the fourth direction of propagation 440 in the optical region of the projection optics 407, and no interfering scattered light is produced, which would be undesirable in the light pattern in front of the vehicle.

This third configuration, however, has the disadvantage that the efficiency of the overall assembly is unfavourably compromised, since less light can be received from the light source. In addition, the controllable reflector 490, often a DLP® chip, is restricted in the maximum permissible angle of incidence, such that the use of a striped incident light, i.e. if a light beam is radiated only partially in the desired direction of projection, is not expedient.

Figure 5:
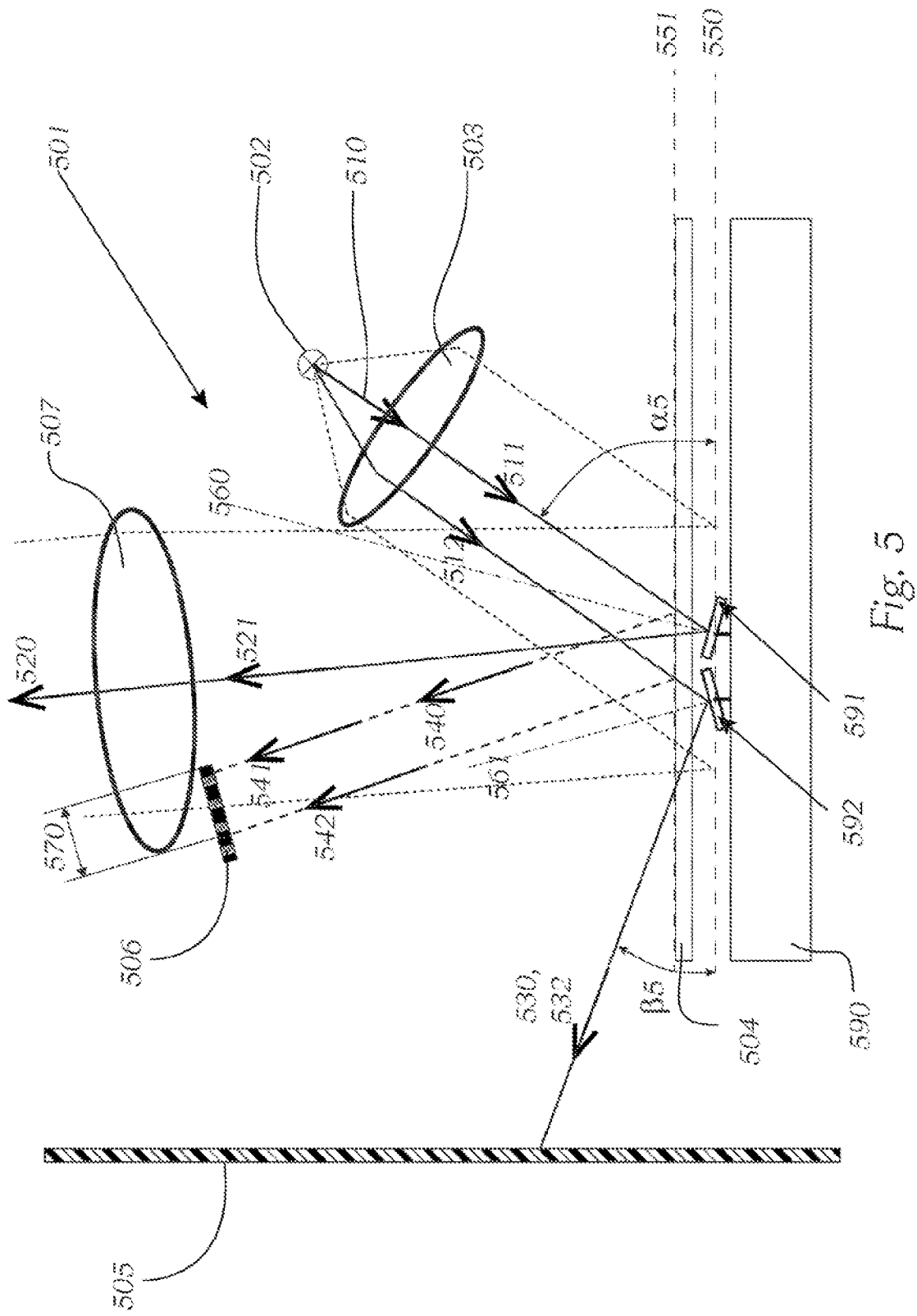
FIG. 5 shows a schematic depiction of the operating principle of an arrangement according to the invention.

FIG. 5 schematically shows a vehicle headlamp 501 according to the invention with key components, which comprises a light source unit 502, a primary optics 503, a controllable reflector 590, an optically transparent cover 504, an optical absorber device 505, an optical shielding element 506, and a projection optics 507.

The light source unit 502 is designed to emit light and to illuminate in a first direction of propagation 510, in the optical path of which the controllable reflector 590 is arranged. The controllable reflector 590 at least partially reflects the light in a second direction of propagation 520, in the optical path of which the projection optics 507 is arranged and is oriented in a direction in front of the vehicle in order to form a light pattern in front of the vehicle.

The controllable reflector 590 comprises an arrangement with a plurality of controllable individual mirrors 591, 592, the reflective surfaces of which, in a non-tilted basic position, are level and jointly form a first plane 550 and for example are arranged in the form of a rectangular matrix of individual mirrors 591, 592.

The light emitted by the light source unit 502 is incident on the first controllable reflector 590 at a first angle $\alpha 5$ in the first direction of propagation 510, and in a first controlled state of said reflector is reflected thereby in the direction of the second direction of propagation 520. In a second controlled state of the controllable reflector 590, the light is reflected in the direction of the optical absorber device 505 at a second angle $\beta 5$.

The optically transparent cover 504 is arranged in a second plane 551 between the light source unit 502 and the controllable reflector 590 in such a way that light can pass through the optically transparent cover 504 in the first direction of propagation 510 and in the second direction of propagation 520.

The light emitted from the light source unit 502 is incident on the optically transparent cover 504 at the first angle $\alpha 5$ in the first direction of propagation 510, and is reflected partially thereby and parallel to the second direction of propagation 520 in a fourth direction of propagation 540, and is blocked in the fourth direction of propagation 540 by the optical shielding element 506.

The optical shielding element 506 overlaps with the projection region of the projection optics 507 insofar as the directions of propagation of the second direction of propagation 520 and the fourth direction of propagation 540 have a common region of light propagation.

In this exemplary embodiment of the invention the light source unit 502 comprises at least one semiconductor light source, preferably a power LED, a high-current LED or a laser diode. Furthermore, the light source unit 502 and the primary optics 503 preferably can be embodied in the form of an optical lens in a common component. The primary optics 503 bundles the emitted light and directs the bundled light towards the controllable reflector 590. Here, a beam shaping can be such that as much light as possible is incident on the rectangular area to be illuminated of the controllable reflector 590 and does not have to be transported away again, unused, in the form of heat. The shown embodiment of the light source unit 502 shows an exemplary construction. However, many other variants for a light source unit are conceivable and are known to a person skilled in the art.

The shielding element 506 is in this example a plate, which allows a particularly simple and favourable design. However, when designing the vehicle headlamp it must be taken into consideration that the plate, which possibly may have reflective properties, should not lead to undesirable impairments in the light pattern of the vehicle headlamp. It is favourable if the shielding element 506 in the form of a reflective plate reflects light to the optical absorber device 505. The optical absorber device 505 in this case can convert light into heat and can transport the heat away suitably.

Alternatively, the shielding element 506 may be an optical absorber. This is favourable insofar as the shielded light can be converted directly at the shielding element 506 into heat, and therefore the optical absorber device 505 of the vehicle headlamp is not additionally heated. As a result, it can be achieved that the optical absorber device 505 is dimensioned more economically, and consequently a smaller overall size of the headlamp as a whole can be attained.

In this exemplary embodiment the shielding element is embodied as a plate 506 and is arranged at least partially in the optical path of the second direction of propagation 520 and in front of the projection optics 507 in order to reduce undesirable light in the fourth direction of propagation 540, and in order to achieve a small design of the vehicle headlamp 501 and require only low precision of the dimensions and position of the shielding element 506. The plate 506 can be embodied as part of the projection optics 507, such that positioning errors are minimised.

The width of the region of overlap of the projections in the directions of propagation 520 and 540 defines a parameter 570. This parameter 570 specifies the extent to which the optical path of the first direction of propagation 520 is covered or reduced by the shielding element 506. This reduction restricts the degrees of freedom in the design of a vehicle headlamp and may require larger individual components or a larger design on the whole, which is undesirable.

Alternatively, the shielding element 506 in the fourth direction of propagation 540 may be arranged at least partially in the optical path of the second direction of propagation 520 and after the projection optics 507, whereby the shielding and associated optical reflections or thermal emissions occur geometrically distanced far from the optical absorber device, which may be favourable for the distribution of the thermal losses within the vehicle headlamp. This embodiment is shown in FIG. 6.

In the embodiment of the invention according to FIG. 5 the second plane 551 is arranged parallel to the first plane 550.

Figure 6:
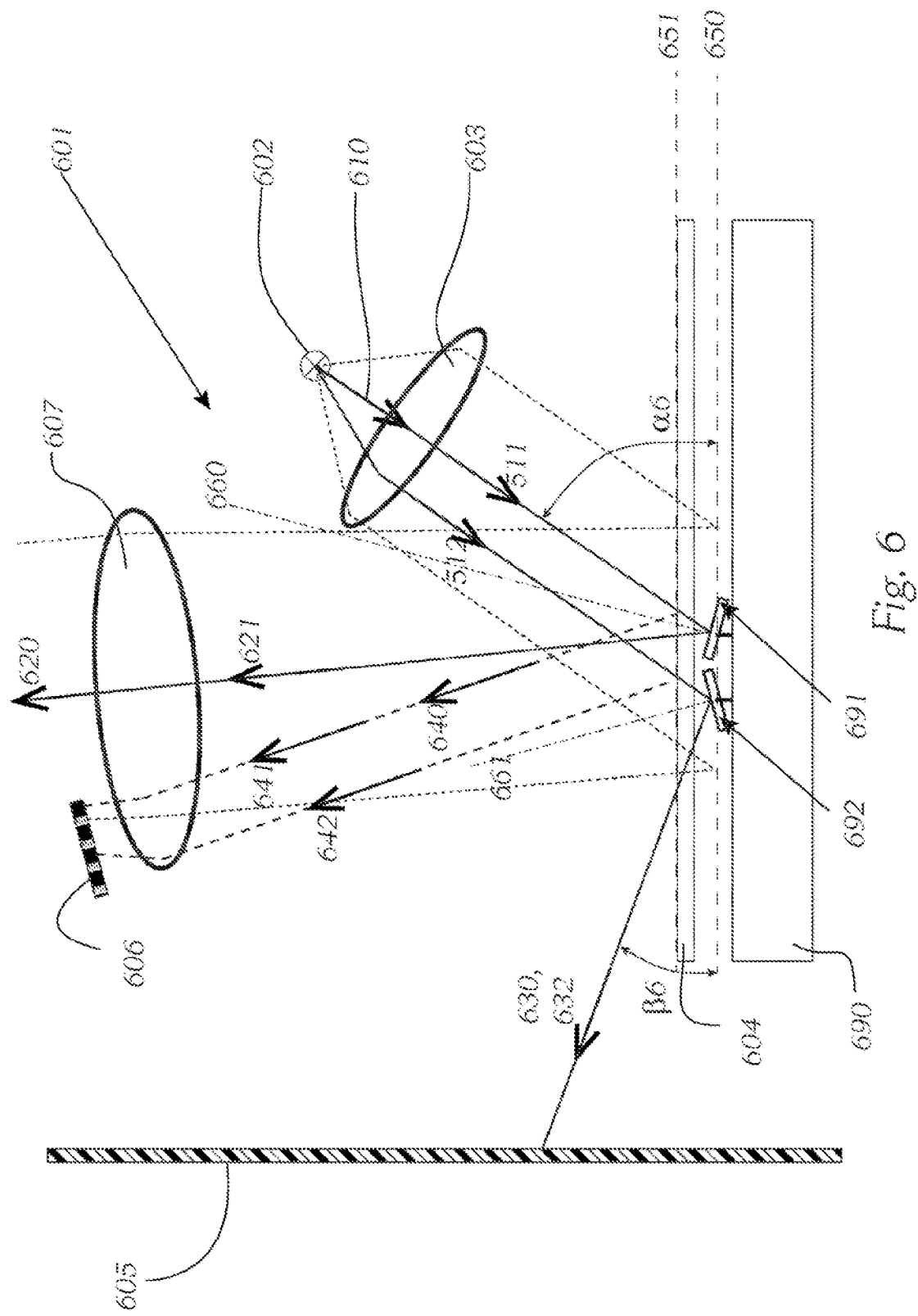
FIG. 6 shows a schematic depiction of the operating principle of an arrangement in a fourth configuration, comprising a controllable reflector with an optically transparent cover in a first angular position.

FIG. 6 shows a schematic illustration of the operating principle of an arrangement of a vehicle headlamp 601 according to the invention in a fifth configuration, which is a development of the arrangement according to FIG. 5, wherein a shielding element or a plate 606 is arranged in the fourth direction of propagation 640 after a projection lens 607.

The descriptions provided in relation to the previous figures, in particular the description of the shielding element 606, apply similarly for the other elements and illustrations of the shown vehicle headlamps 601.

Figure 7:
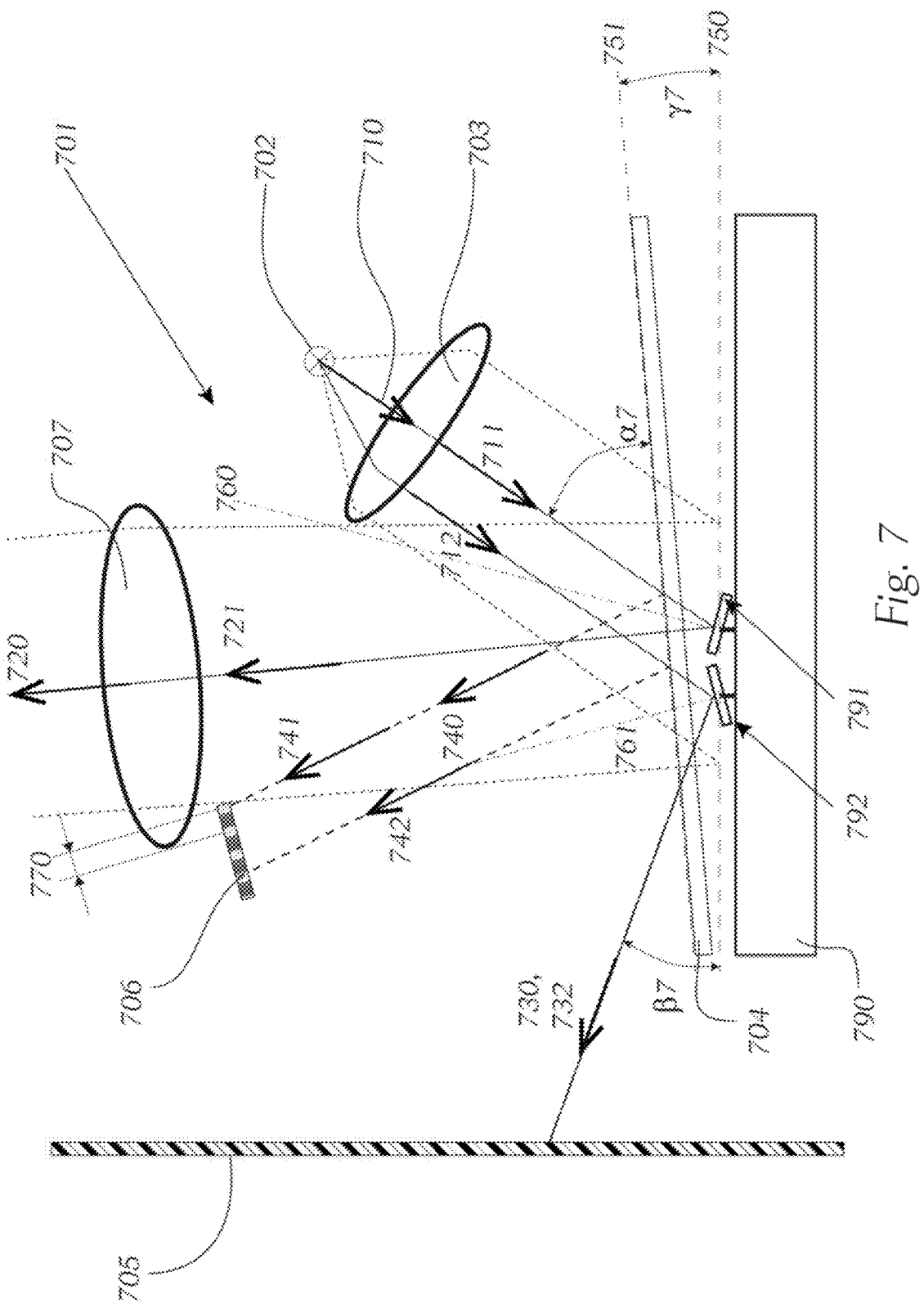
FIG. 7 shows a schematic depiction of the operating principle of an arrangement in a fixed configuration, comprising a controllable reflector with an optically transparent cover in a second angular position.

FIG. 7 shows a schematic illustration of the operating principle of an arrangement of a vehicle headlamp 701 according to the invention in a fourth configuration, which comprises a controllable reflector 790 with an optically transparent cover 704 in a second angular position, in which the controllable reflector 790 and the optically transparent cover 704 enclose a third angle $\gamma 7$, which is greater than 0°.

The controllable reflector 790 comprises an arrangement of a plurality of controllable individual mirrors 791, 792, the reflective surfaces of which, in a non-tilted basic position, are level and jointly form a first plane 750 and for example are arranged in the form of a rectangular matrix of individual mirrors 791, 792.

The optically transparent cover 704 is arranged in a second plane 751 between the light source unit 702 and the controllable reflector 790 in such a way that light can pass through the optically transparent cover 704 in the first direction of propagation 710 and in the second direction of propagation 720.

The descriptions of the previous drawings apply similarly for the other elements and illustrations of the shown vehicle headlamps 701.

The second angular position of the optically transparent cover 704 is defined in such a way that the second plane 751 is arranged at a third angle γ7 relative to the first plane 750.

As a result of this measure it can be achieved that much less light from the fourth direction of propagation 740 passes into the optical region of the projection optics 707 and generates interfering scattered light, which would be undesirable in the light pattern in front of the vehicle.

The width of the region of overlap of the projections in the direction of propagation 720 and 740 defines the parameter 770. By comparison, the parameter 720 is smaller than the parameter 570 according to FIG. 5, whereby an increase in the efficiency of the projection optics and in particular an improvement of the light pattern can be achieved, since the third angle γ7 ensures that the reflections are directed at least only partially in the second direction of propagation 720, and consequently only a smaller proportion in the light image has to be suppressed by an optical shielding element 706.

It is clear that with a multi-part projection optics a shielding element may also be arranged between the individual elements of the multi-part projection optics. In this case it is a question of defining which elements of the multi-part projection optics forms the most essential function of a projection optics and consequently acts as a "main projection optics". Consequently, a shielding element may be arranged before or after the main projection optics, similarly to the arrangements according to FIG. 5, FIG. 6 and FIG. 7.

FIG. 8 shows an embodiment of a projection lens 807 and a shielding element or a plate 806, wherein the plate 806 is applied to the projection lens 807. As a result of this embodiment it can be achieved that these two components of a vehicle headlamp are manufactured in such a way that they are optically and mechanically matched to one another, and only a common holder is required, which offers cost advantages. Depending on the orientation of the projection lens 807, an arrangement similar to FIG. 5, FIG. 6 or FIG. 7 can be created.

FIG. 9a shows a light distribution of a vehicle headlamp with DLP® technology according to the prior art, wherein the light distribution is defined by a chessboard-like test pattern, which is illustrated over a horizontal axis H and a vertical axis V, with the differently hatched areas showing different regions in each case with the same light intensity.

FIG. 9b shows the intensity distribution according to FIG. 9a in the plane of section A-A, in which it can be seen that in the illustrated case with a chessboard-like test pattern the intensities fluctuate between a minimum value I00 and a maximum value I01. A contrast value can be determined from the ratio of these two extreme values I01 and I00.

FIG. 10a shows a light distribution of a vehicle headlamp according to the invention in an illustration similar to FIG. 9a.

FIG. 10b shows an intensity distribution according to FIG. 10a in the plane of section B-B, in which it can be seen that in the illustrated case with a chessboard-like test pattern the intensities fluctuate between a minimum value I10 and a maximum value I11, wherein the minimum value I10 is much lower than the minimum value I00 according to FIG. 9b or is practically zero and consequently the vehicle headlamp according to the invention creates a much better contrast value in the light pattern.

LIST OF REFERENCE SIGNS

| | |
|---|---|
| 100 | electronics housing |
| 101, 201, 301, 401, 501, 601, 701 | vehicle headlamp |
| 102, 202, 302, 402, 502, 602, 702 | light source unit |
| 103, 203, 303, 403, 503, 603, 703 | primary optics |
| 190, 290, 390, 490, 590, 690, 790 | controllable reflector |
| 191, 291, 391, 491, 591, 691, 791, 192, 292, 392, 492, 592, 692, 792 | controllable individual mirrors |
| 104, 304, 404, 504, 604, 704 | optically transparent cover |
| 105, 205, 305, 405, 505, 605, 705 | optical absorber device |
| 506, 606, 706, 806 | optical shielding element |
| 107, 107a, 207, 307, 407, 507, 607, 707, 807 | projection optics |
| 210, 310, 410, 510, 610, 710 | first direction of propagation |
| 211, 311, 411, 511, 611, 711, 212, 312, 412, 512, 612, 712 | first light beams |
| 120, 220, 320, 420, 520, 620, 720 | second direction of propagation |
| 221, 321, 421, 521, 621, 721 | second light beams |
| 130, 230, 330, 430, 530, 630, 730 | third direction of propagation |
| 232, 332, 432, 532, 632, 732 | third light beams |
| 440, 540, 640, 740 | fourth direction of propagation |
| 441, 541, 641, 741, 342, 442, 542, 642, 742 | fourth light beams |
| 250, 350, 450, 550, 650, 750 | first plane |
| 351, 451, 551, 651, 751 | second plane |
| 260, 360, 460, 560, 660, 760, 261, 361, 461, 561, 661, 761 | surface normal |
| 570, 770 | parameter for overlap |
| α2, α3, α4 α5, α6, α7 | first angle |
| β2, β3, β4, β5, β6, β7 | second angle |
| γ7 | third angle |
| H | horizontal axis |
| V | vertical axis |
| I00, I01, I10, I11 | light intensity or illumination intensity |

The invention claimed is:

1. A vehicle headlamp (501, 601, 701) for a vehicle, comprising:

at least one light source unit (502, 602, 702);

at least one controllable reflector (590, 690, 790);

at least one optically transparent cover (504, 604, 704);

at least one optical absorber device (505, 605, 705);

at least one optical shielding element (506, 606, 706, 806); and at least one projection optics (507, 607, 707, 807), wherein the at least one light source unit (502, 602, 702) is designed to emit light and to illuminate in a first direction of propagation (510, 610, 710), in the optical path of which the at least one controllable reflector (590, 690, 790) is arranged, and the at least one controllable reflector (590, 690, 790) at least partially reflects the light in a second direction of propagation (520, 620, 720), in the optical path of which the at least one projection optics (507, 607, 707, 807) is arranged and is oriented in a direction in front of the vehicle, in order to form a light pattern in front of the vehicle, wherein the at least one controllable reflector (590, 690, 790) comprises an arrangement of multiple controllable individual mirrors (591, 691, 791, 592, 692, 792), the reflective surfaces of which in a non-tilted state are arranged level in a first plane (550, 650, 750), wherein the light emitted from the at least one light source unit (502, 602, 702) is incident on the at least one controllable reflector (590, 690, 790) in the first direction of propagation (510, 610, 710) and in a first controlled state of said reflector is reflected thereby in the direction of the second direction of propagation (520, 620, 720) and/or is reflected in a second controlled state of the at least one controllable reflector (590, 690, 790) in a third direction of propagation (532, 632, 732), wherein the at least one optically transparent cover (504, 604, 704) is arranged in a second plane (551, 651, 751) between the at least one light source unit (502, 602, 702) and the at least one controllable reflector (590, 690, 790) in such a way that light passes through the at least one optically transparent cover (510, 610, 710) in the first direction of propagation (520, 620, 720) and in the second direction of propagation (504, 604, 704), wherein the light emitted by the at least one light source unit (502, 602, 702) is incident on the at least one optically transparent cover (504, 604, 704) in the first direction of propagation (510, 610, 710) and is reflected thereby partially in a fourth direction of propagation (540, 640, 740) and in the fourth direction of propagation (540, 640, 740) is blocked by the at least one optical shielding element (506, 606, 706, 806); and wherein the at least one shielding element (506, 606, 706) is arranged at least partially in the optical path of the second direction of propagation (520, 620, 720) and after the at least one projection optics (507, 607, 707, 807).

2. The vehicle headlamp (101) according to claim 1, wherein the at least one optical absorber device (505, 605, 705) is arranged in the third direction of propagation (532, 632, 732).

3. The vehicle headlamp (101) according to claim 1, wherein the second plane (551, 651, 751) is parallel to the first plane (550, 650, 750).

4. The vehicle headlamp (201) according to claim 1, wherein the second plane (551, 651, 751) is arranged at a third angle (γ6) (γ7) to the first plane (550, 650, 750), wherein the third angle (γ7) is greater than 0° and less than 15°.

5. The vehicle headlamp (501, 601, 701) according to claim 1, wherein the at least one shielding element (506, 606, 706) is arranged at least partially in the optical path of the second direction of propagation (520, 620, 720) and in front of the at least one projection optics (507, 607, 707, 807).

6. The vehicle headlamp (501, 601, 701) according to claim 1, wherein the at least one shielding element (506, 606, 706) is a plate.

7. The vehicle headlamp (501, 601, 701) according to claim 1, wherein the at least one shielding element (506, 606, 706) is an optical absorber.

8. The vehicle headlamp (501, 601, 701) according to claim 1, wherein the at least one shielding element (506, 606, 706) and the at least one optical absorber device (505, 605, 705) are embodied as a common component.

9. The vehicle headlamp (501, 601, 701) according to claim 1, wherein the light emitted by the at least one light source unit (502, 602, 702) in the first direction of propagation (510, 610, 710) is incident on the at least one optically transparent cover (504, 604, 704) at a first angle (α5, α6, α7), wherein the first angle (α5, α6, α7) lies in a range between 50° and 65°.

10. The vehicle headlamp (501, 601, 701) according to claim 1, wherein the at least one light source unit (502, 602, 702) comprises at least one semiconductor light source.

11. The vehicle headlamp according to claim 1, wherein the reflective surfaces in the non-tilted state are arranged in the form of a rectangular matrix of individual mirrors (191, 291).

12. The vehicle headlamp according to claim 4, wherein the third angle (γ7) is greater than 0° and less than 5°.

13. The vehicle headlamp according to claim 9, wherein the first angle (α5, α6, α7) lies in a range between 50° and 60°.

14. The vehicle headlamp according to claim 10, wherein the at least one light source unit (502, 602, 702) comprises a high-power LED, a high-current LED, or a laser diode.

15. The vehicle headlamp according to claim 10, wherein the at least one light source unit (502, 602, 702) further comprises a primary optics (103, 203) in the form of an optical lens.

16. A vehicle headlamp (501, 601, 701) for a vehicle, comprising:
    at least one light source unit (502, 602, 702);
    at least one controllable reflector (590, 690, 790);
    at least one optically transparent cover (504, 604, 704);
    at least one optical absorber device (505, 605, 705);
    at least one optical shielding element (506, 606, 706, 806); and
    at least one projection optics (507, 607, 707, 807),
    wherein the at least one light source unit (502, 602, 702) is designed to emit light and to illuminate in a first direction of propagation (510, 610, 710), in the optical path of which the at least one controllable reflector (590, 690, 790) is arranged, and the at least one controllable reflector (590, 690, 790) at least partially reflects the light in a second direction of propagation (520, 620, 720), in the optical path of which the at least one projection optics (507, 607, 707, 807) is arranged and is oriented in a direction in front of the vehicle, in order to form a light pattern in front of the vehicle,
    wherein the at least one controllable reflector (590, 690, 790) comprises an arrangement of multiple controllable individual mirrors (591, 691, 791, 592, 692, 792), the reflective surfaces of which in a non-tilted state are arranged level in a first plane (550, 650, 750),
    wherein the light emitted from the at least one light source unit (502, 602, 702) is incident on the at least one controllable reflector (590, 690, 790) in the first direction of propagation (510, 610, 710) and in a first controlled state of said reflector is reflected thereby in the direction of the second direction of propagation (520, 620, 720) and/or is reflected in a second controlled state of the at least one controllable reflector (590, 690, 790) in a third direction of propagation (532, 632, 732),
    wherein the at least one optically transparent cover (504, 604, 704) is arranged in a second plane (551, 651, 751) between the at least one light source unit (502, 602, 702) and the at least one controllable reflector (590, 690, 790) in such a way that light passes through the at least one optically transparent cover (510, 610, 710) in the first direction of propagation (520, 620, 720) and in the second direction of propagation (504, 604, 704),
    wherein the light emitted by the at least one light source unit (502, 602, 702) is incident on the at least one optically transparent cover (504, 604, 704) in the first direction of propagation (510, 610, 710) and is reflected thereby partially in a fourth direction of propagation (540, 640, 740) and in the fourth direction of propagation (540, 640, 740) is blocked by the at least one optical shielding element (506, 606, 706, 806); and wherein the at least one projection optics comprises a multi-part projection optics, wherein the at least one optical shielding element is arranged between individual elements of the multi-part projection optics.

* * * * *